> United States Patent [19]

Moore et al.

[11] Patent Number: 4,704,293

[45] Date of Patent: Nov. 3, 1987

[54] GEL CONFECTIONS

[75] Inventors: Carl O. Moore, Rochester; Cheryl Brown, Decatur, both of Ill.

[73] Assignee: A. E. Staley Manufacturing Company, Decatur, Ill.

[21] Appl. No.: 913,427

[22] Filed: Sep. 30, 1986

[51] Int. Cl.⁴ ............................................. A23G 3/00
[52] U.S. Cl. .................................... 426/573; 426/660; 426/661; 426/578
[58] Field of Search ................ 426/578, 660, 661, 573

[56] References Cited

U.S. PATENT DOCUMENTS 3,218,177 11/1965 Robinson ............................ 426/578
4,219,582 8/1980 Cheng ................................ 426/578
4,567,055 1/1986 Moore ............................... 426/578

Primary Examiner—Jeanette Hunter
Attorney, Agent, or Firm—Michael F. Campbell; James B. Guffey; J. Daniel Wood

[57] ABSTRACT

A process for preparing a gel confection comprises: (a) heating a first component comprising sugar, water, and a first gelling agent under conditions which activate the first gelling agent; (b) preparing a second component comprising a second gelling agent which is a granular, nonbirefringent cold-water-swelling starch under conditions which prevent activation of the second gelling agent; (c) mixing the first component and the second component under conditions which activate the second gelling agent; (d) obtaining the desired mixture viscosity for forming; and (e) forming the mixture into the desired shape.

14 Claims, No Drawings

GEL CONFECTIONS

FIELD OF THE INVENTION

This invention relates to food products. More particularly, this invention relates to gel confections.

BACKGROUND OF THE INVENTION

Gel confections such as imitation fruit pieces, fruit bars, jelly bean centers, and sugared jellies have been prepared with sugar, water, and starch for many years. These confections have a firm, but soft, texture which contributes to their desirable mouthfeel. The gel confections are typically manufactured by a starch mold casting process known in the trade as the Mogul system. In this process, the ingredients are cooked at a temperature above the boiling point of the mixture and/or at a moisture level above that of the finished confection for a sufficient length of time to fully activate, or gelatinize, the starch. In a typical pressure cooking process for a commercial Mogul system, the ingredients are cooked at a moisture level of about 20 to 25 weight percent at a temperature of about 140° to 180° C. for less than about 1 minute. The strach is generally an acid-thinned (also known as thin-boiling) common corn starch or a high-amylose starch or a blend thereof. After cooking, the hot liquid mixture is deposited into a starch mold. The starch mold forms the confection and helps to reduce the moisture content. The deposited confections are then routinely dried for about 24 to 72 hours to reach the desired moisture content of about 14 to 20 weight percent.

There are many disadvantages of the Mogul system. High temperature cooking causes carmelization which is detrimental to flavor and appearance. Cooking at high moisture levels requires subsequent drying. However, cooking at lower temperatures and/or with lower moisture levels does not fully gelatinize the starch. Ungelatinized starch does not significantly contribute to gel structure and, instead, functions only as filler. The primary disadvantage of the Mogul system is probably that it is extremely slow, due to the necessity of drying. For these and other reasons, a demand exists for a gel confection process which is faster, uses lower temperatures, and forms the confection at the desired moisture level.

Such a process is disclosed in Moore, U.S. Pat. No. 4,567,055, issued Jan. 28, 1986, which is incorporated by reference. The Moore process comprises heating and extruding a mixture of sugar, water, and about 12 to 20 weight percent of a cold-water-swelling starch having an especially high gel strength. The starch is gelatinized as the mixture passes through the extruder, which subjects the mixture to heat and shear under high pressure. Optional ingredients include colors, flavors, fruit purees, juice concentrates, and acidulants. The relatively high level of the cold-water-swelling, high-gel-strength starch is employed to give the mixture a sufficiently-high viscosity for forming at the moisture level of the confection. This high level of starch also contributes to a final product texture which is firm, but more resilient than the traditional Mogul system gel confection.

Accordingly, a demand still exists for a process for preparing gel confections which is fast, uses moderate temperatures, forms the confection at or near final moisture level, and produces a gel confection which has the same textural character as the traditional Mogul system gel confection.

SUMMARY OF THE INVENTION

The object of this invention is to provide an improved process for preparing a gel confection.

We have discovered such a process. the process comprises: (a) heating a first component comprising sugar, water, and a first gelling agent under conditions which activate the first gelling agent; (b) preparing a second component comprising a second gelling agent, characterized in that it is an instant starch capable of hydrating in room temperature water, under conditions which prevent activation of the second gelling agent; (c) mixing the first component and the second component under conditions which activate the second gelling agent and to produce a mixture comprising about 40 to 80 weight percent sugar, about 10 to 50 weight percent water, about 1 to 20 weight percent of the first gelling agent, and about 1 to 10 weight percent of the second gelling agent; (d) obtaining the desired mixture viscosity for forming; and (e) forming the mixture into the desired shape.

This process combines the processing advantages of speed and moderate temperature of the Moore process with the desirable product qualities of the Mogul system.

DETAILED DESCRIPTION OF THE INVENTION A. The First Component

The first confection component prepared in the process of this invention is a mixture of sugar, water and a first gelling agent. A mixture of these three ingredients is relatively conventional in confection preparation. The term "sugar" is used to described a carbohydrate having one, two, or more saccharose groups. In other words, the term is not used as a synonym for sucrose. Sugar in a confection is used primarily for sweetness, but also plays an important role in such physical properties of the confection as crystallinity, gel strength, humectancy, and water activity. Sugars suitable for use include sucrose, glucose (also known as dextrose), fructose, maltose, invert sugar, and sorbitol. The sugar may be added in crystalline or other solid form or it may be added in the form of an aqueous solution such as a corn syrup containing dextrose, maltose, and higher saccharides or a high fructose corn syrup containing fructose, dextrose, and higher saccharides. The less sweet and less expensive surgars such s corn syrup solids and low calorie bulking sugars such as polydextrose are useful in conjunction with non-sugar sweeteners such as aspartame and saccharin. A preferred sugar is a blend of sucrose and corn syrup because of cost and the desirable physical properties imparted to the confection.

The water present in the first component provides moisture to the confection and is necessary for activation of the first gelling agent. The water may be added separately or as part of another ingredient, as in a corn syrup.

The first gelling agent provides gel strength to the mixture as it is formed and also contributes to the gel strength of the finished confection. The first gelling agent is ctivated by heating the first component. Suitable first gelling agents include starch, pectin, agar, alginate, cellulose gums, gelatin, gums, flour, and the like. Starches are preferred for the physical properties they impart to the gel confection. Any type of starch capable of thickening or gelling is acceptable. (Acid-thinned common corn starches and high-amylose starches are preferred because of their gel-strength and reduced hot viscosity.) An especially preferred acid-thinned starch is MIRA-SET ® 285 corn starch, a commercial product of the A. E. Staley Manufacturing Company, which exhibits gel strengths markedly superior to a conventional acid-thinned starch of equal fluidity.

As mentioned above, the first gelling agent is ctivated by heating in the presence of sugar and water. The physical change in the gelling agent associated with activation depends on the identity of the gelling agent. For example, starch activation is the result of hydration and gelatinization of the starc granules. The temperatures, pressure, and duration of heating required for activation is a function of the identity of the gelling agent and the quantity of water in the system. There is nothing critical about the type of equipment used for heating. Cooking under atmospheric pressure in a heated vessel is a convenient method of simultaneously activating the gelling agent and reducing moisture content. Alternatively, pressure cooking can be advantageously employed when moisture reduction is not necessary.

A wide variety of other ingredients can be included in the first component. When preparing imitation fruit bits or fruit snack bars, a fruit derivative such as whole fruit pieces, fruit purees, fruit concentrates, and fruit juices, is often included in the first component. Other optional ingredients include flavorings and colorings.

B. The Second Component

The second confection component comprises a second gelling agent characterized in that it is a starch capable of hydrating in room temperature water, known in the trade as an "instant" starch. There are two basic types of instant starch: (1) precooked (also known as pregelatinized) starch; and (2) cold-water- swelling granular starch. The latter is preferred and it is more preferred that the second gelling agent is a granular and nonbirefringent starch having a fat content of less than 0.25 weight percent, a cold-water solubility of greater than 50 weight percent, and a gel strength of greater than 90 grams. The cold water solubility is measured by the test described in Example 1 and the gel strength is measured by the test described in Example 2. Eastman, U.S. Pat. No. 4,465,702, issued Aug. 14, 1984, which is incorporated by reference, describes a process for preparing such a starch. Suitable starches include unmodified (i.e., no chemical modification other than the alcohol processing described in Eastman) and modified (e.g., substituted, cross-linked, thin-boiling, and oxidized) corn, tapioca, and potato starches.

It is preferred that this starch comprise an unmodified or lightly-modified corn starch. Unmodified and lightly-modified corn starches which have been alcohol processed as described in Eastman exhibit gel strengths greater than 90 grams. This high gel strength enables the formation of a resilient, cleanly-sliceable gel confection. Unmodified corn starch has the greatest gel strength, making it most preferred. Such a starch is MIRA-GEL ™ 463 corn starch, a commercial product of the A. E. Staley Manufacturing Company.

It is important that the second gelling agent not be activated (i.e., hydrated and gelatinized) until it is mixed with the first component shortly before the confection is formed. Premature exposure of the second gelling agent to the first component can result in acid-thinning if a naturally-acidic fruit derivative or other source of acidity is present. Acid-thinning reduces the gelling agent's hot viscosity and adversely affects the ability of the mixture to be formed. Premature exposure of the second gelling agent ot a hydrating medium can cause premature partial or complete gelatinization which, in turn, can cause lumpiness and/or lead to a breakdown of gel structure during confection formation. In other words, it is very desirable that no physicl changes to the second gelling agent occur until immediately before formation so that the gel development reaches its desired level for confection formation, and so the confection formation occurs immediately upon development of the desired viscosity. Other sequences of gelatinization are possible, but they adversely affect the physical properties of the gel confection.

Accordingly, the second component is substantially free of a hydrating medium. The second component may consist only of the second gelling agent, but is is more convenient for material handling and processing to disperse the second gelling agent in liquid, edible, non-hydrating ingredients. A high fructose corn syrup or other aqueous sugar solution having a solids level of at least about 70 weight percent is suitable at room temperature because hydration is minimal. Elevated temperatures increase hydration and are, therefore, undesirable. The second gelling agent can be dispersed in a corn syrup at a level of about 25 weight percent. A preferred liquid, edible, non-hydrating medium is an edible oil, especially a vegetable oil such as soybean, corn, cottonseed, coconut, or a combination thereof. The vegetable oils are non-hydrating regardless of temperature and can completely disperse the second gelling agent at a level of about 50 weight percent. Furthermore, the oil actually contributes to the sliceability and mouthfeel of the gel confection.

As with the first component, a variety of other ingredients can be included in the second component.

C. Mixing and Extruding

The first component, containing the activated first gelling agent, and the second component, containing the unactivated second gelling agent, are mixed together shortly before the confection is formed into the desired shape. The moisture and latent heat in the first component are sufficient to rapidly gelatinize the second gelling agent even though the temperature of the mixture is less than its boiling point. For example, when the second gelling agent is added to a first component having a moisture content of about 20 weight percent at a temperature of about 100° C. and rapidly mixed, the mixture develops the desired formation viscosity in about 3 to 15 minutes. Insufficient gel development before confection formation results in a runny product incapable of holding its shape. Excessive gel development before confection formation results in an excessive breakdown of gel structure during confection formation. Gel structure broken down during confection formation does not fully redevelop and results in a less firm product.

A variety of other ingredients may be added as the second component is mixed with the first component. The addition of a fruit derivative at this stage may be advantageous over adding it to the first component prior to activation of the first gelling agent because activation may deteriorate the fruit derivative.

Mixing the components is performed with conventional equipment. The formation of the mixture into the desired confection shape is also performed with conventional equipment. For example, extruders, rollers, etc. are conveniently used.

The composition of the mixture during confection formation is generally about 40 to 80, preferably about 50 to 70, weight percent sugar; about 10 to 50, preferably about 15 to 25, weight percent water; about 1 to 20, preferably about 5 to 15, weight percent of the first gelling agent; and about 1 to 10, preferably about 2 to 7, weight percent of the second gelling agent. The mixture optionally comprises about 1 to 25, preferably about 2 to 10, weight percent fruit derivative; about 1 to 10, preferably about 2 to 7, weight percent vegetable oil; and about 1 to 10, preferably about 1 to 5, weight percent of other ingredients such as flavorings, colors, and acidulants. The above ingredients are given on a dry substance basis.

After formation, the gel confections are used as is or may be further processed. For example, they may be coated with an edible material such as sugar, oil, or starch. They may also be dried if a very low water activity product is desired.

D. Examples

These Examples are illustrative only.

EXAMPLE 1

This Example describes the test used to measure the cold-water-solubility of a starch.

The following equipment is used in the test:

1. Waring Model PB5 Blender equipped with a semi-micro monel metal clip;
2. International Model K Centrifuge or similar centrifuge;
3. 100 ml centrifuge tubes;
4. Evaporating dish; and
5. Balance.

The test procedure is as follows:

1. Pour 100 ml of distilled water at room temperature into the Waring Blender cup;
2. Turn the blender on slow speed (about 6100 rpm) and add 1.00 g dry substance basis of starch over less than a 15 second period.
3. Stir on high speed (about 13,500 rpm) for 2 minutes;
4. Pour the starch solution/suspension into a 100 ml centrifuge tube and centrifuge at maximum speed (3100 rpm is satisfactory) for 15 minutes;
5. Transfer a 25 ml aliquot of the supernatant to a tared evaporating dish and evaporate on a steam bath to apparent dryness; and
6. Dry in an oven at 110° C. for at least 1 hour and weight.

The cold-water-solubility of the starch, expressed as weight percent water solubles on a dry substances basis, is then calculated according to the following formula:

Cold-water-solubility (% dsb)=Wt. of solids in 25 ml×4×100

EXAMPLE 2

This Example describes the test used to measure the gel strength of a starch.

The following equipment is used in the test:

1. Voland Stevens LFRA Texture Analyzer with Integrated Recorder and one-half inch AOAC spindle;
2. Sunbeam Mixmaster Mixed with 6 inch mixing bowl; and
3. Balance.

The test procedure is as follows:

1. Mix 47.5 g dry substance starch and 150 g ISOSWEET ® 5500 Syrup (a high fructose corn syrup manufactured and sold by the A. E. Staley Manufacturing Company containing about 77 percent saccharide and having a ratio of fructose to glucose of 55 to 45) for 2 minutes in the mixer at speed #1;
2. Add 450 ml of distilled water at room temperature and continue mixing at speed #1 for 45 to 50 seconds;
3. Mix at speed #6 for 2 minutes;
4. Let the mixture stand at room temperature for 15 minutes;
5. Place the mixing bowl on the texture analyzer and measure the gel strength at the following settings: penetration speed, 1.0 mm per second and penetration distance, 20 mm.

EXAMPLE 3

This Example illustrates the preparation of imitation blueberry bits.

The following ingredients (the "First Component") were added to a first heated vessel:

| INGREDIENT | QUANTITY (G) |
| --- | --- |
| Frozen blueberry puree (12% dsb) | 2100 |
| SWEETOSE ® 4300 corn syrup (82% dsb) | 2000 |
| Water | 1800 |
| Sucrose | 1640 |
| MIRA-SET 285 corn starch | 500 |

SWEETOSE 4300 corn syrup is a 63 D.E. (dextrose equivalent) corn syrup which is a commercial product of the A. E. Staley Manufacturing Company.

The following ingredients (the "Second Component") were added to a second heated vessel:

| INGREDIENT | QUANTITY (G) |
| --- | --- |
| Hydrogenated vegetable oil | 154 |
| MIRA-GEL 463 corn starch | 154 |
| Blueberry flavor | 42 |
| Citric acid | 9 |

The blueberry flavor was McCormick & Sons, Inc. product number F21936.

The first component was cooked at about 109° C. to a solids level of 80 weight percent. The second component was heated to about 50° C. to melt the oil. The second component was blended into the first component immediately after cooking. The mixture was allowed to cool at room temperature for about 5 minutes. The hardened mixture was then placed in pastry bags (funnel-shaped paper cups having an opening at the bottom) and extruded (by manually squeezing the bags) in ⅜ inch diameter ropes. The ropes were rolled in fine granulated sucrose and cooled overnight at room temperature. The ropes were then cut into lengths of approximately ⅜ inch.

The resulting imitation blueberry bits had a pleasant taste, a soft and desirable mouthfeel, and a water activity of about 0.6. They were shelf-stable, retained their integrity when mixed in a blueberry muffin batter with an electric mixer, and did not "bleed" when baked in blueberry muffins.

EXAMPLE 4

This example illustrates the preparation of strawberry fruit bars.

The following ingredients (the "First Component") were added to a first heated vessel:

| INGREDIENT | QUANTITY (G) |
| --- | --- |
| Frozen strawberry puree (12% dsb) | 2100 |
| SWEETOSE 4300 corn syrup (82% dsb) | 2000 |
| Water | 1800 |
| Sucrose | 1640 |
| MIRA-SET 285 corn starch | 420 |

The following ingredients (the "Second Component") were added to a second heated vessel:

| INGREDIENT | QUANTITY (G) |
| --- | --- |
| Hydrogenated vegetable oil | 154 |
| MIRA-GEL 463 corn starch | 154 |

The first component was cooked at about 109° C. to a solids level of 80 weight percent. The second component was heated to about 50° C. to melt the oil. The second component was blended into the first component immediately after cooking. Also blended into the first component were 571 g macaroon-shred coconut and 4 g strawberry flavor, Ottens Company product number 3090. The mixture was allowed to cool at room temperature for about 10 minutes. The hardened mixture was spread between plastic film sheets into a slab having a thickness of about ⅜ inch. The slab was cooled at about 5° C. for 15 minutes. The film sheets were then removed and the slab was cut into bars.

The resulting shelf-stable strawberry fruit bars had a pleasant taste and a soft and desirable mouthfeel.

EXAMPLE 5

This Example illustrates the preparation of jelly bean centers.

The following ingredients (the "First Component") were added to a first heated vessel:

| INGREDIENT | QUANTITY (G) |
| --- | --- |
| SWEETOSE 4300 corn syrup (82% dsb) | 2320 |
| Water | 3560 |
| Sucrose | 1600 |
| MIRA-SET 285 corn starch | 532 |

The following ingredients (the "Second Component") were added to a second heated vessel:

| INGREDIENT | QUANTITY (G) |
| --- | --- |
| Hydrogenated vegetable oil | 209 |
| MIRA-GEL 463 corn starch | 209 |

The first component was cooked at about 110° C. to a solids level of 83 weight percent. The second component was heated to about 50° C. to melt the oil. The two components were mixed and formed as described in Example 3 except that the ropes were cooled at about 5° C. for 15 minutes and were then cut into lengths of approximately ½ inch.

The resulting shelf-stable jelly bean centers had a pleasant taste and a soft and desirable mouthfeel.

We claim:

1. A process for preparing a gel confection, which process comprises:
   (a) heating a first component comprising sugar, water, and a first gelling agent under conditions which activate the first gelling agent;
   (b) mixing the first component with a second gelling agent which is a non-hydrated instant starch gelling agent under conditions which activate the second gelling agent and to produce a mixture comprising about 40 to 80 weight percent water, about 1 to 20 weight percent of the first gelling agent, and about 1 to 10 weight percent of the second gelling agent; and
   (c) forming the mixture into the desired shape.

2. The process of claim 1 wherein the second gelling agent comprises a granular and nonbirefringent starch having a fat content of less than 0.25 weight percent, a cold-water solubility of greater than 50 weight percent, and a gel strength of greater than 90 grams.

3. The process of claim 2 wherein the first gelling agent comprises a starch.

4. The process of claim 2 wherein a mixture viscosity suitable for forming is obtained about 3 to 15 minutes after the first component and the second component are mixed.

5. The process of claim 1 further comprising dispersing, prior to said mixing, said second gelling agent in an edible, non-hydrating liquid.

6. The process of claim 5 wherein the mixture additionally comprises about 1 to 25 weight percent fruit derivative.

7. The process of claim 6 wherein the edible non-hydrating liquid comprises an edible oil and the mixture additionally comprises about 1 to 10 weight percent edible oil 8. The process of claim 7 wherein the first gelling agent comprises an acid-thinned common corn starch or high-amylose corn starch.

9. The process of claim 8 wherein the sugar comprises sucrose and a corn syrup.

10. The process of claim 5 wherein said liquid is a high fructose corn syrup or other aqueous sugar solution having a solids level of at least about 70 weight percent.

11. The process of claim 5 wherein said liquid is an edible vegetable oil selected from the group consisting of soybean, corn, cottonseed, coconut, or a combination thereof.

12. A process for preparing a gel confection, which process comprises:
   (a) heating a composition comprising sugar, water and a first hydratable gelling agent comprised of a member selected from the group consisting of starch, pectin, agar, alginate, gelatin and flour, under conditions which hydrate said first gelling agent, to form a first component;
   (b) mixing said first component with a second component comprising a non-hydrated instant starch gelling agent so as to hydrate said non-hydrated instant starch gelling agent and to produce a mixture comprising about 40 to 80 weight percent sugar, about 10 to 50 weight percent water, about 1 to 20 weight percent of the first gelling agent and about 1 to 10 weight percent of the instant starch gelling agent; and
   (c) forming the mixture into the desired shape.

13. A process of claim 12 further comprising dispersing, prior to said mixing, said non-hydrated instant starch gelling agent in an edible, non-hydrating liquid to form said second component.

14. A process for preparing a gel confection, which process comprises:
   (a) heating a composition comprising sugar, water and a starch gelling agent to form a gelatinized first component;
   (b) preparing a dispersion comprising an instant starch gelling agent while preventing hydration thereof to form a non-hydrated second component;
   (c) mixing the first component and the second component so as to hydrate the instant starch gelling agent and to produce a mixture comprising about 40 to about 80 weight percent sugar, about 10 to 50 weight percent water, about 1 to 20 weight percent of the first gelling agent and about 1 to 10 weight percent of the instant starch gelling agent; and
   (d) forming the mixture into the desired shape.

* * * * *